July 21, 1936.  A. F. DORMEYER  2,048,184
MOTOR DRIVEN BEATER
Filed Feb. 17, 1930  3 Sheets-Sheet 2
Fig. 3.
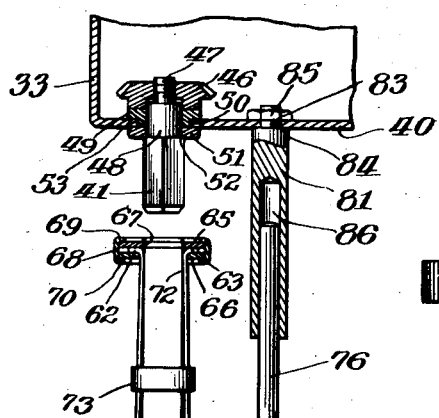
Fig. 4.
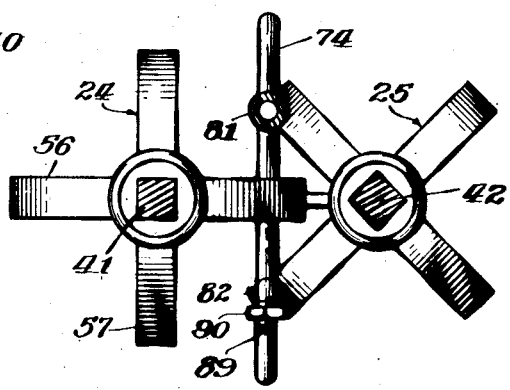
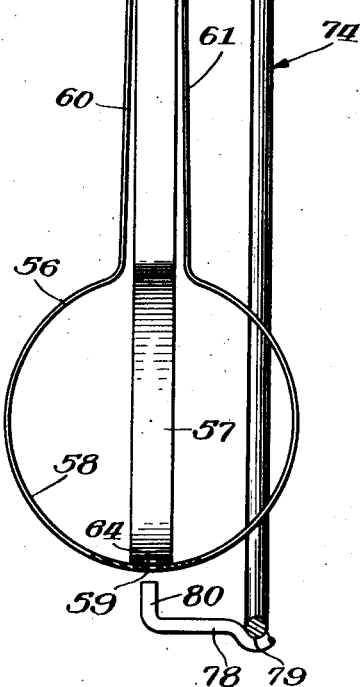
Fig. 8.
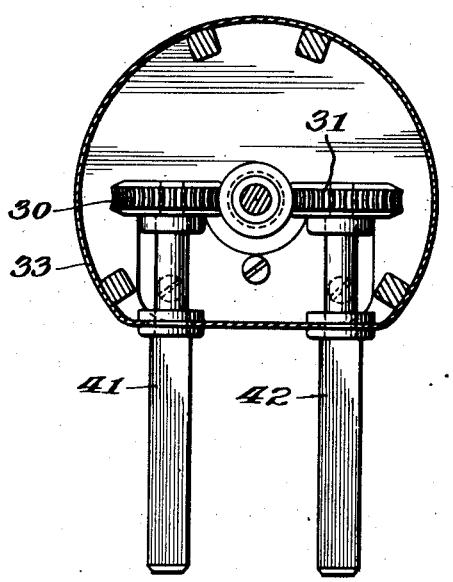
Inventor
Albert F. Dormeyer
By Williams Bradbury
McCaleb & Hinkle Attys July 21, 1936.  A. F. DORMEYER  2,048,184
MOTOR DRIVEN BEATER
Filed Feb. 17, 1930   3 Sheets-Sheet 3
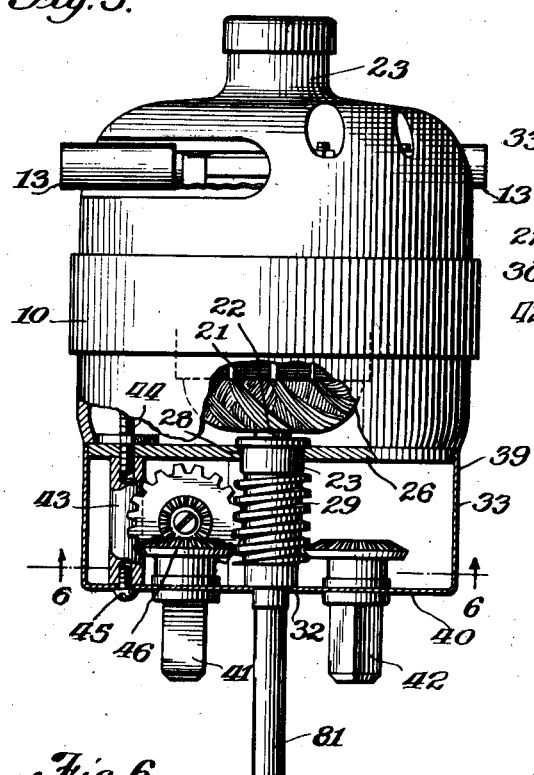
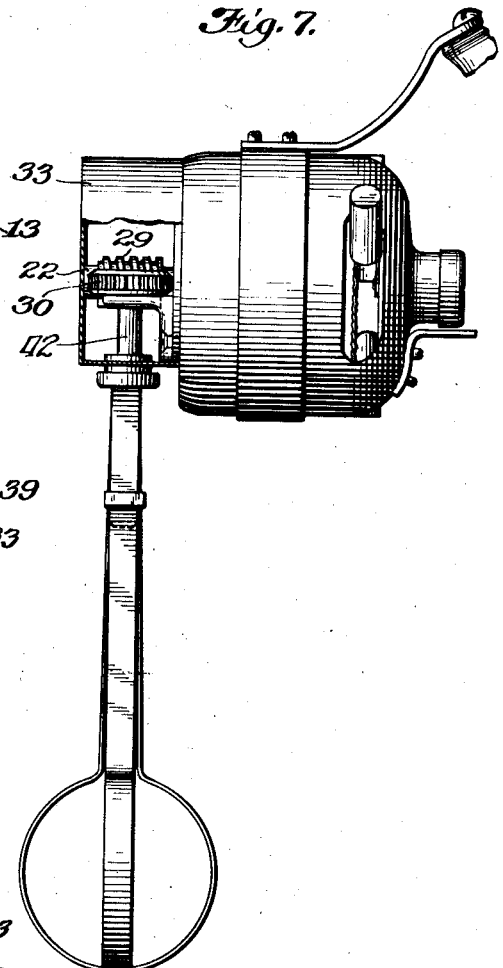
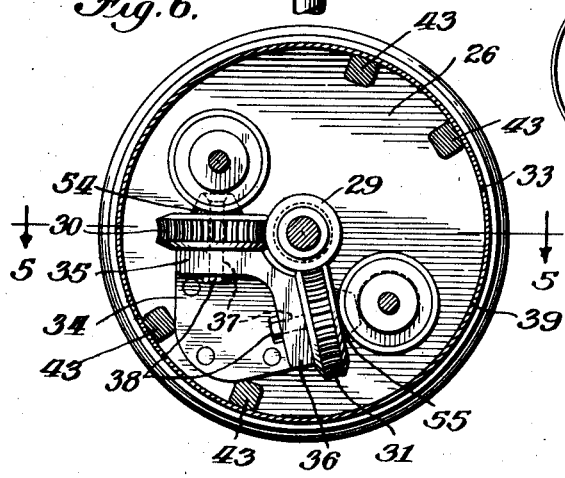
Inventor
Albert F. Dormeyer
By Williams, Bradbury,
McCaleb & Hinkle Attys.

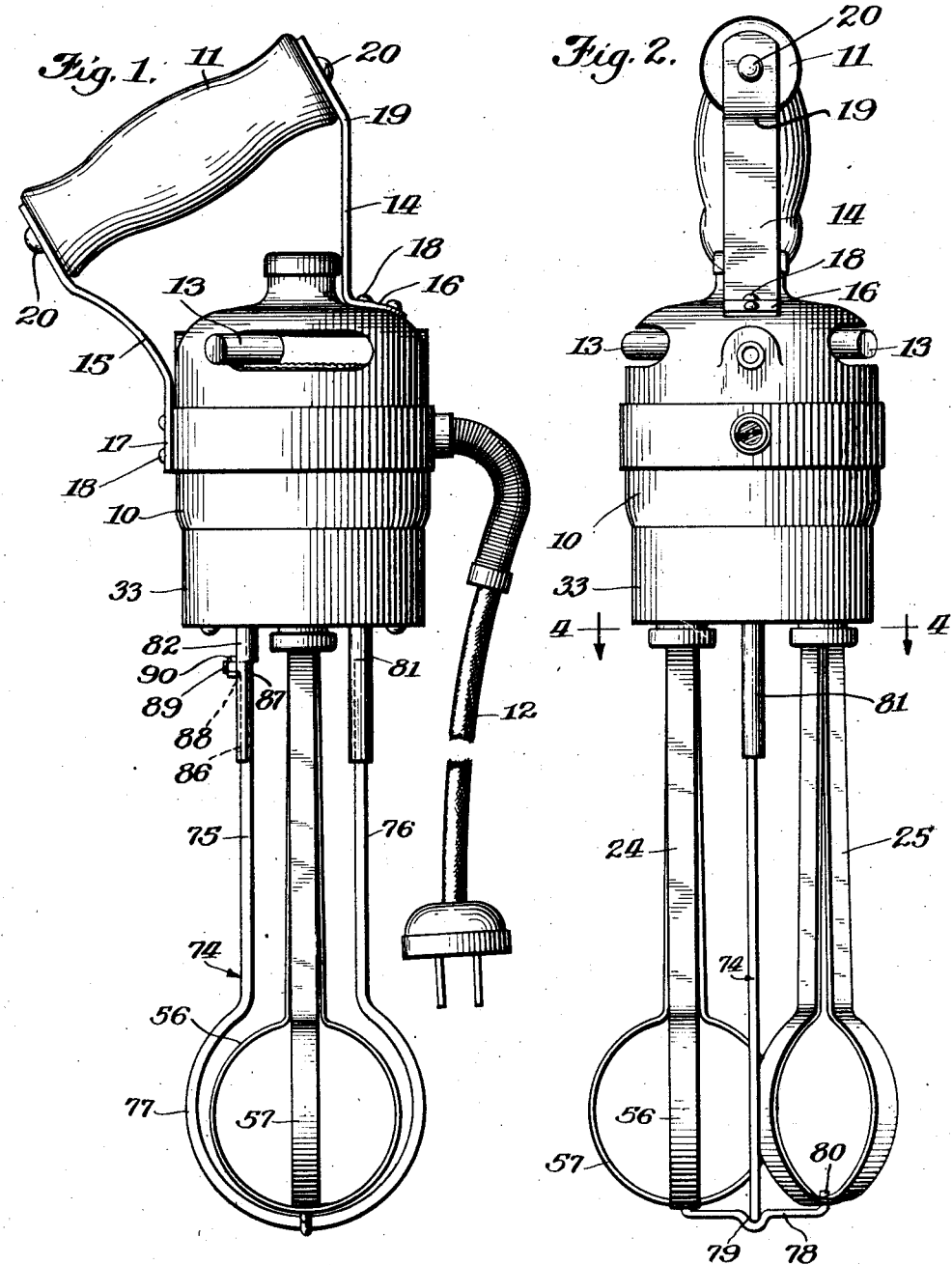

Patented July 21, 1936

2,048,184

UNITED STATES PATENT OFFICE 2,048,184

MOTOR DRIVEN BEATER

Albert F. Dormeyer, Chicago, Ill., assignor, by mesne assignments, to Hamilton Beach Manufacturing Co., Racine, Wis., a corporation of Wisconsin Application February 17, 1930, Serial No. 428,897

3 Claims. (Cl. 259—131)

The present invention relates to motor driven beaters, adapted for beating eggs, whipping cream, mixing batters, and for other purposes.

One of the objects of the invention is the provision of a portable unitary structure, which is light, compact and well-balanced, so that it is capable of being easily handled and used for its intended purpose.

Another object is the provision of an improved driving mechanism or gearing for beaters of the type having a pair of beater elements.

Another object is the provision of a motor driven beater mechanism which is readily applicable to ordinary electric motors, thereby enabling a manufacturer to construct finished motor driven beaters by the addition of the drive mechanism, beaters and other parts to a standard electric motor.

Another object is the provision of an improved motor driven beater having a very simple yet effective and efficient driving mechanism for the beater rods, including a worm and worm gear operatively connected with a pair of beater shafts or rods, and with the shaft of the motor to drive the beaters in opposite directions.

Another object is the provision of an improved beater mechanism, which may be enclosed in a compact gear casing for attachment to any of a plurality of standard motors on the market.

Another object is the provision beater mechanism, having means for facilitating the cleansing of the device without danger of wetting the motor or gears. This is accomplished by providing beater elements which are removably mounted on the lower ends of the beater shafts or rods, so that the beater elements are removable from the gearing or other mechanism.

Another object is the provision of an improved form of removable support for journaling the lower ends of the beaters and holding the upper ends of the beaters in operative engagement with the lower ends of the beater shafts.

Other objects and advantages of the invention will be apparent from the following description and the accompanying drawings in which similar characters of reference indicate similar parts throughout the several views.

Referring to the drawings:

Fig. 1 is a side elevational view of the motor driven beater;

Fig. 2 is a front elevational view;

Fig. 3 is an exploded detail view of a part of the beater support and one beater element;

Fig. 4 is a sectional view taken on the plane of the line 4—4 in Fig. 2;

Fig. 5 is an elevational view of the motor unit with the casing broken away to show the driving mechanism;

Fig. 6 is a sectional view taken on the plane of the line 6—6 of Fig. 5;

Fig. 7 is an elevational view of an equivalent or modified form of motor driven beater with a slightly different drive mechanism;

Fig. 8 is a detail sectional view through the gear casing showing the drive mechanism for the modified type of Fig. 7.

Referring to Figs. 1 and 2, the motor driven beater, which is the subject of the present invention, preferably includes a standard electric motor 10, which is provided with a handle 11, and with any appropriate form of electric supply cord 12 for connection to wall sockets or other source of supply. The motor 10 is preferably a series motor of the universal type, capable of operation on either direct current or alternating current, and it may be provided with adjustable commutator brushes capable of being adjusted by means of the handles 13 to vary the speed of the motor.

In the present embodiment, the handle 11 comprises a pair of sheet metal straps 14 and 15, each of which is formed with an attaching flange 16, 17 of appropriate shape to engage the adjacent surface of the motor 10, and the attaching flanges 16 and 17 are preferably secured to the motor by screw bolts 18.

The strap 14 projects upward from the casing of motor 10 to a point 19 where the strap is bent over to provide a support for the inclined handle 11, which may be secured to the strap by a wood screw 20.

The other strap 15 is bent outward from the motor casing 10 to provide space for the handle 11, and its end is likewise secured to the handle 11 by a wood screw 20 or any other fastening means in such a manner that the handle 11 is inclined at the angle which is most convenient for manipulation by the user of the mixer. The motor 10 is, of course, provided with an armature 21 fixedly supported on an armature shaft or motor shaft 22, and the shaft 22 is rotatably mounted in bearings 23 carried by the opposite ends of the motor casing 10.

In order to enclose and protect the driving mechanism for a pair of beaters 24, 25, the device is provided with a gear casing 33, and the shaft 22 preferably projects from the end of the motor casing to provide an operative mechanical connection between the motor armature and the driving mechanism for the beaters 24 and 25.

The casing of motor 10 may be provided at its one end with a cover plate 26, which is secured to the casing 10 with a plurality of screw bolts 27, and the cover plate is provided with a centrally located aperture 28 for fixedly receiving the bearing 23.

The motor shaft 22 fixedly supports a worm 29, which is adapted to provide an operative mechanical connection with a pair of worm gears 30, 31 for driving the beaters 24 and 25 at a reduced rate of speed in opposite directions. In the embodiment illustrated in Fig. 5, the shaft 22 is incidentally of sufficient length to project from an opening 32 in the gear casing 33, and under such conditions the shaft 22 also performs the function of aiding in the location and support of gear casing 33, but since the shaft 22 is journaled in the motor 10, it will be obvious that it need extend no further than is sufficient to support the worm 29.

In order to rotatably support the worm gears 30 and 31, for operative engagement with the opposite sides of the worm 29, the plate 26 which forms an inner wall of a gear casing 33 preferably supports a bearing bracket 34 having a pair of downwardly extending bearing flanges 35 and 36, each of which is provided with an aperture 37. The worm gears 30 and 31 may then be rotatably supported on the bearing flanges 35, 36 by the screw bolts 38, which pass through flanges 35, 36 and through the worm gears to rotatably support said gears.

Since the worm gear 30 engages one side of worm 32 while worm gear 31 engages the opposite side, it will be evident that these worm gears will rotate in opposite directions in a manner peculiarly adapted to be used for driving double beaters 24, 25 of the type shown in Figs. 1 and 2. The beaters 24 and 25 are preferably so disposed that they intermesh with each other without contact, and consequently, they must be rotated in opposite directions at the same rate of speed and constantly maintained in the proper relative position to each other.

In the embodiment illustrated in Figs. 1 to 6, the axis of the beaters 24 and 25 extends in the same direction as the shaft of the motor 22 for the purpose of locating the beaters underneath the motor casing 10 and approximating a balanced motor structure. It is not necessary, however, to arrange the beaters 24, 25 parallel to the motor shaft in every embodiment of the invention as will be evident from Figs. 7 and 8, where the beaters extend in a direction at right angles to the shaft of the motor 10.

The gear casing 33 in the present embodiment may consist of a substantially cylindrical metal member, having an outward wall 39, which is adapted to fit around the outer edge of the plate 26 carried by motor casing 10, and the casing 33 is also provided with a relatively flat bottom wall 40 for rotatably supporting a pair of beater shafts or rods 41 and 42. The gear casing 33 may be secured to motor casing 10 by any convenient securing mechanism, such as a plurality of metal posts 43, each having a threaded bore at each end of the post for receiving the screw bolts 44 and 45, which secure the gear casing 33, posts 43 and plate 26 together.

The beater rods or shafts 41 may be identical in form, and consequently, only one of these members need be described in detail. For instance, the beater shaft 41 comprises a metal member, the upper end of which is threaded and adapted to be fixedly secured to a bevel gear 46, having a complementary threaded bore. Below the threaded portion 47, the beater rod 41 is provided with a cylindrical journal 48, and the bearing 49 supports the bevel gear 46 in spaced relation to the lower wall 40 of gear casing 33. The cylindrical portion 48 of beater rod 41 may extend below the lower wall 40 of gear casing 33, the wall 40 being provided with an aperture 50 for receiving the bearing 49, and the beater shaft 41 may also support an outer washer 51 against a shoulder 52.

The low ends of the beater rods 41 and 42 are preferably non-circular in form to engage in complementary sockets in the beaters 24 and 25, so that the beaters will be driven by the beater rods. It will thus be observed that when the bevel gear 46 is fixedly secured upon the beater rod 41, the bearing 49 and washer 51 are confined between the shoulder 52 and the bevel gear 46, and the wall 40 is confined between the annular flange 53 on bearing 49 and the washer 51, so that the beater rods 41 and 42 with their gears are rotatably mounted in the gear casing 33.

Where it is desired to have the beaters 24 and 25 located below the body of the motor, as in Figs. 1 to 6, the worm gears 30 and 31 may be provided with integral bevel gears 54 and 55 located to mesh with the bevel gears 46 carried by beater rods 41 and 42, but if it is desired to locate the beater shafts at right angles to the motor shaft, the bevel gears may be eliminated and the worm gears 30 and 31 carried directly by the beater shafts 41 and 42, as illustrated in Figs. 7 and 8.

The beaters 24 and 25 may be identical in shape, and consequently, it is only necessary to describe one of these beaters in detail. The beaters 24 and 25 are each made removable from the lower ends of the beater rods 41 and 42, so that the beaters may be separated from the motor and mechanism for cleaning, and the beaters may be washed without possibility of wetting the motor or other mechanism.

Each of the beaters may consist of one or two sheet metal beating elements 56, 57, the preferred construction employing two such beating elements, as shown in Fig. 3. The beating element 56 consists of a strip of relatively flat and thin sheet metal, having a substantially circular lower portion 58, which is provided with an aperture 59, forming a bearing for rotatably supporting the beater at its lower end.

The circular portion of beater element 56 is provided with a pair of upwardly extending legs 60 and 61 which may be provided at their upper ends with laterally turned attaching flanges 62 and 63. The other beating element 57 of the same beater is exactly the same in shape, but is disposed at right angles to the beating element 56 with its lower hole 64 in registry with the hole 59. The sheet metal beating elements 56 and 57 are preferably secured together at their upper ends by providing a pair of washers 65 and 66, each having substantially square apertures 67, and the washers 65, 66 are arranged on opposite sides of the laterally turned flanges 62, 63 on the beating elements.

The washers 65, 66 and end flanges 62, 63 may be secured in fixed relation to each other by providing an annular ferrule 68 having an inwardly extending annular flange 69 above the upper washer 65, and having an inwardly extending annular flange 70 below the washer 66. One of the flanges 69, 70 is preferably formed after the parts are assembled, as shown in Fig. 3, by crimping inward the edge of the ferrule 68 to clamp the ferrule on the washers and beater elements, and to securely fasten the assembly together to form a unitary beater. It will be observed that each of the beaters 24 and 25 is thus provided with a non-circular socket 72 for receiving the lower end of the beater rods or shafts 41, 42. If desired, the sockets 72 may be made of such size that the beater shafts 41, 42 are frictionally gripped by the opposed resilient sides of the beater elements 56 and 57 adjacent socket 72, thereby eliminating any necessity for other types of devices for maintaining the beaters on the beater rods 41, 42, and additional means of support for the beaters on the beater rods may be provided by the sliding collar 72, which draws the legs 60, 61 into closer frictional engagement with beater rods 41, 42.

The motor driven mixer is also preferably provided with some means for connecting together the lower ends of the beaters 24, 25, which may consist of a guard or frame 74 carried by the motor or gear casing. The guard 74 may be constructed of a rod or wire having a pair of upwardly extending legs 75, 76, and having a substantially circular lower portion 77, which extends out beyond the circular portions of the beater elements 56, 57.

The lower end of guard 74 is provided with a transverse wire frame member 78, which may be formed with a groove or socket 79 and spot-welded to the medial point of the guard 74 at its lower end. Each end of the transverse wire frame member 78 may be turned upward to form a bearing pin 80, adapted to be received in the holes 59, 64 in the beaters 24, 25, and when the beaters are in assembled relation, as shown in Fig. 2, the guard 74 provides additional means for rotatably supporting the beaters 24, 25 at their lower ends.

In order to provide for the convenient removal of the beaters 24, 25, the guard 74 is removably mounted on the motor 10, and consequently, the lower wall 40 of the gear casing 33 may also support a pair of guard securing members 81, 82. The guard securing member 81 comprises a metal stud, having an upper reduced threaded end 83, forming a shoulder 84, and the stud 81 may be secured to wall 40 by a nut 85, which confines the wall 40 between shoulder 84 and the nut. The lower end of stud 81 is provided with an axial bore 86, forming a tubular member capable of slidably receiving the upper end of the leg 76 on guard 74. The other guard securing member 82 may be secured to the gear casing 33 in a similar manner, and it is also preferably provided with an axial bore 86, but the lower half of the stud 82 is preferably cut away as at 87, leaving a substantially semi-cylindrical groove in the member 82 for receiving the wire 75 of guard 74.

The stud 82 may also be provided with a transverse aperture 88, and the extreme end of leg 75 of guard 74 may be bent over at substantially right angles to form a latching device 89 for engaging in the aperture 88 and retaining the guard in the studs 81, 82. The end 89 of wire leg 75 may also be threaded to receive nut 90, thereby permanenttly securing the guard and motor in assembled relation where this is desirable.

The guard 74 being resilient, the legs 75 and 76 may be grasped by the fingers and pressed together while the leg 76 is slid into the bore 86, and the beaters 24, 25 having been assembled upon the journals 80 of the transverse wire 78, the complete assembly, which is shown in exploded position in Fig. 3, may be slid upward until the hooked end 89 of leg 75 slides into the aperture 88 to retain the guard upon the motor 10. The resilience of the legs 75, 76 is sufficient to secure the guard in the position of Fig. 1, but the nut 90 provides additional and more permanent securing means.

Referring to Figs. 7 and 8, the structure illustrated in these figures is a modified form in which the beater rods or shafts 41, 42 are mounted in the side of a gear casing 33 which has been modified accordingly. The beater shafts 41 and 42 of this embodiment may carry the worm gears 30, 31 in position to be directly engaged by the worm 29 on motor shaft 22, thereby eliminating the bevel gears 46, 54, 55.

It will be obvious that many different types of intermediate mechanical connections may be provided, depending upon the exact direction in which it is desired to have the beaters extend with respect to the motor shaft, but the provision of the worm on the motor shaft and the worm gears engaged thereby on opposite sides of the worm eliminates any necessity for other gearing to drive the beaters in opposite directions.

It will thus be observed that I have invented an improved motor driven beater, which is peculiarly simple and light in its construction, and capable of being constructed by the addition of a drive mechanism and beaters to ordinary standard motors.

The device includes the gear casing fixedly secured to the motor with a pair or rotatable rods or shafts mounted in the gear casing and depending therefrom, gearing for operatively connecting rods with the motor shaft, and beater elements quickly detachably mounted on the lower ends of said rotatable rods.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a motor driven beater, the combination of a motor having a casing and a motor shaft protruding from said motor casing, a separate gear casing carried by said motor casing, a pair of beater shafts journaled in said gear casing, operative mechanical connections in said gear casing for driving said beater shafts in opposite directions from said motor shaft, a pair of beaters actuated by said beater shafts, and removable famework for supporting said beaters on said shafts, said framework comprising a wire member having a pair of legs removably mounted on said gear casing and a pair of upwardly turned pins for journaling the lower ends of said beaters.

2. In a motor driven beater, the combination of a motor having a casing and a motor shaft protruding from said motor casing, a separate gear casing carried by said motor casing, a pair of beater shafts journaled in said gear casing, operative mechanical connections in said gear casing for driving said beater shafts in opposite directions from said motor shaft, a tubular member carried by said gear casing, a grooved member carried by said gear casing, a pair of beaters operatively connected with said beater shafts, and a guard having one leg slidably mounted in said tubular member, and the other leg secured in said grooved member.

3. In a beater, the combination of a driving mechanism having a pair of beater shafts, with a pair of beaters having non-circular sockets for receiving said shafts, a supporting frame for said mechanism, a guard for removably supporting said beaters on said shafts, said guard comprising a substantially U-shaped member having means for rotatably supporting the lower ends of said beaters, a tubular member carried by said frame for slidably supporting one end of said guard and a grooved member having a socket for receiving the other end of said guard.

ALBERT F. DORMEYER.